Nov. 22, 1949

R. D. PETTY ET AL 2,488,878

EXTRACTION OF PENICILLIN

Filed July 28, 1945

INVENTORS
ROBERT D. PETTY,
CHARLES A. RICKABAUGH,
BY
Harvey W. Edelblute
ATTORNEY Patented Nov. 22, 1949

2,488,878

UNITED STATES PATENT OFFICE 2,488,878

EXTRACTION OF PENICILLIN

Robert Douglas Petty, Nanuet, N. Y., and Charles Albert Rickabaugh, Park Ridge, N. J., assignors, by mesne assignments, to American Cyanamid Company, New York, N. Y., a corporation of Maine Application July 28, 1945, Serial No. 607,640

3 Claims. (Cl. 260—302)

This invention relates to an improvement in the art of extracting acid-labile biological substances, such as penicillin, from aqueous solutions thereof.

The therapeutically active substance commonly known as penicillin is a metabolic product resulting from the growth of certain fungi of the genus Penicillium, particularly of the species notatum, crysogenum, etc., in suitable culture media. The substance as formed in the fermentation liquor is believed to be a mixture of related complex organic acids. Ordinarily, no effort is made to separate these acids into individual fractions, the metabolic products being collectively isolated as alkali metal or alkaline earth metal salts and packaged and sold under the generic name "Penicillin."

Conventional methods of extracting penicillin from the fermentation liquor usually involve extraction of an aqueous solution containing the mixed penicillin acids with a water-immiscible, non-polar, organic solvent. Penicillin acids are ionizable and are very soluble in water. To increase the solubility of the acids in the non-polar solvent and make it possible to extract a high percentage of the valuable constituents of the solution, it is necessary to decrease the degree of ionization of the acids by increasing the hydrogen ion concentration of the solution by the addition of a stronger acid.

Figure 1:
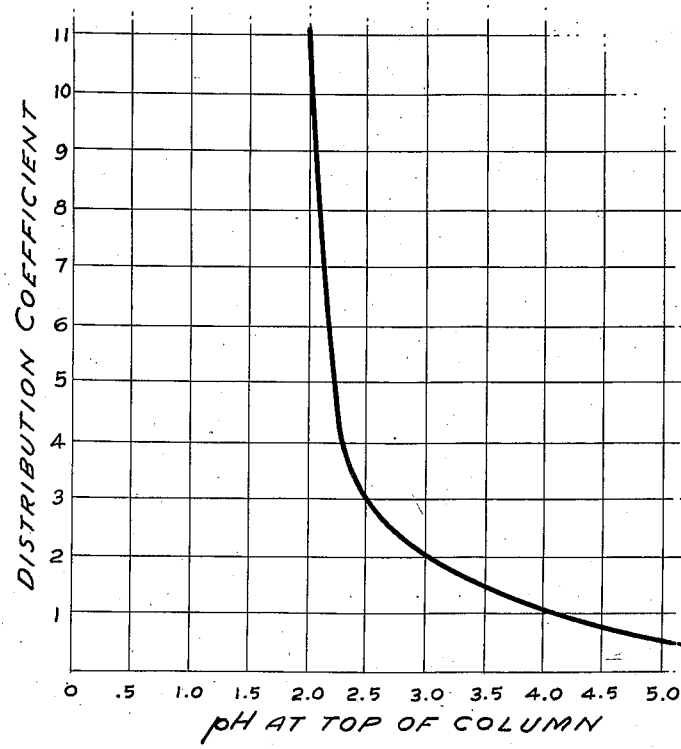

To illustrate the solubility behavior of penicillin in a two phase solvent system, reference is made to Figure 1 of the drawing which illustrates the distribution coefficient of penicillin between a typical filtered fermentation liquor containing penicillin and amyl acetate at different pH values. The curve on the graph was obtained by extracting commercial penicillin fermentation liquor with amyl acetate at different pH values and determining the distribution of penicillin in the amyl acetate and the fermentation liquor. The curve indicates, for example, that at a pH of slightly over 4 each equal volume of amyl acetate and fermentation liquor contains an equal amount of penicillin. On the other hand, at a pH of 2 each cubic centimeter of amyl acetate contains about eleven times as much penicillin as does each cubic centimeter of fermentation liquor. Similar curves are obtained when using other non-polar organic solvents, such as chloroform, isopropyl acetate, butyl alcohol, etc. in place of amyl acetate. In all cases, the highest proportion of penicillin is extracted from a fermentation liquor under the most acidic conditions.

It might appear from the distribution coefficient curve that it would be a comparatively simple matter to extract maximum amounts of penicillin from its aqueous solutions by carrying out the operation at low pH values. As a matter of fact, this is what is done in commercial practice. Unfortunately, however, penicillin is very unstable, particularly in strongly acidic solutions. Although the penicillin in an aqueous solution at a pH of about 6 is comparatively stable and may be allowed to stand for hours at this pH level without serious destruction of penicillin, it is found that at a pH of about 2, the destruction is very rapid and appreciable percentages of the penicillin are destroyed in a matter of minutes. Practical experience has demonstrated the fact that the penicillin must be rapidly extracted from its aqueous solution at a low pH value in a minimum period of time if economical yields of penicillin are to be obtained.

It might also appear from the curve in Figure 1 that it would be possible to extract penicillin from its aqueous solution at a higher pH value by the simple expedient of using a large volume of organic solvent. Unfortunately, the fermentation liquors contain relatively large quantities of undesirable substances which are also soluble in the organic liquid, but which must be eliminated from the final product. To use a large volume of organic solvent would simply result in the presence of intolerable amounts of substances other than penicillin in the product. Also, the use of large volumes of organic solvents in commercial operations is to be avoided as expensive and dangerous. Because of these factors, it is desirable to extract as much penicillin as possible with a minimum amount of solvent. The art has, therefore, been forced to use small volumes of organic solvent at low pH values.

Perhaps the most common method of extracting a substance from its aqueous solution by means of an organic liquid in which it is more soluble is to thoroughly mix the two liquids and allow the two phases to separate. This simple procedure is not feasible on a commercial scale in recovering penicillin from fermentation liquors because of the usual presence in the liquor of substances which tend to cause emulsification. The time required for the emulsion to break and give a clear separation of the two liquids is usually so long that considerable destruction of penicillin takes place at the low pH of the extraction.

Although it is common practice in many arts to extract a soluble substance from one liquid phase into another by passing the two liquids countercurrently through a packed column, this technique has not been found to be applicable to the extraction of penicillin, the reason being that if the liquids are forced through the column at a rate sufficiently rapid to minimize contact time of the penicillin at the low pH and yet secure complete extraction, emulsification of the liquid phase usually occurs. Short contact periods result in incomplete extraction. Simple column extraction has, therefore, not proven to be satisfactory in this art. Other methods of extracting penicillin have been found necessary.

A common method of extracting penicillin, widely employed in the art, involves the thorough mixing of an aqueous solution of penicillin at a pH of about 2 with an immiscible, organic solvent, after which the resulting emulsion is centrifuged to separate the two phases. Although the use of centrifuges cuts down the time of extraction and reduces the loss of penicillin caused by the high acidity of the aqueous phase, there is, nevertheless, a substantial loss of penicillin through destruction by acids. There is also the necessity of maintaining and operating expensive centrifuges to handle the large volume of liquor involved in the process. In addition, the recovery of penicillin under such conditions is not as good as desired.

We have discovered that practically all of the penicillin in aqueous solutions thereof may be extracted with very little destruction of the penicillin content by passing the penicillin-containing liquor adjusted to certain pH levels through a packed column in countercurrent flow to a water-immiscible organic solvent. The process is simple, cheap, easy to operate, gives a high yield of product, and avoids the necessity of operating mixers, centrifuges, and other expensive power-consuming equipment.

One of the essential features of the countercurrent extraction method of the invention which distinguishes it over conventional methods of countercurrent extraction is that the aqueous liquor is first extracted to remove most of the penicillin at a pH at which the rate of destruction is low and the final extraction is carried out under more acidic conditions under which it is possible to remove practically all of the penicillin remaining in the aqueous phase.

Figure 2:
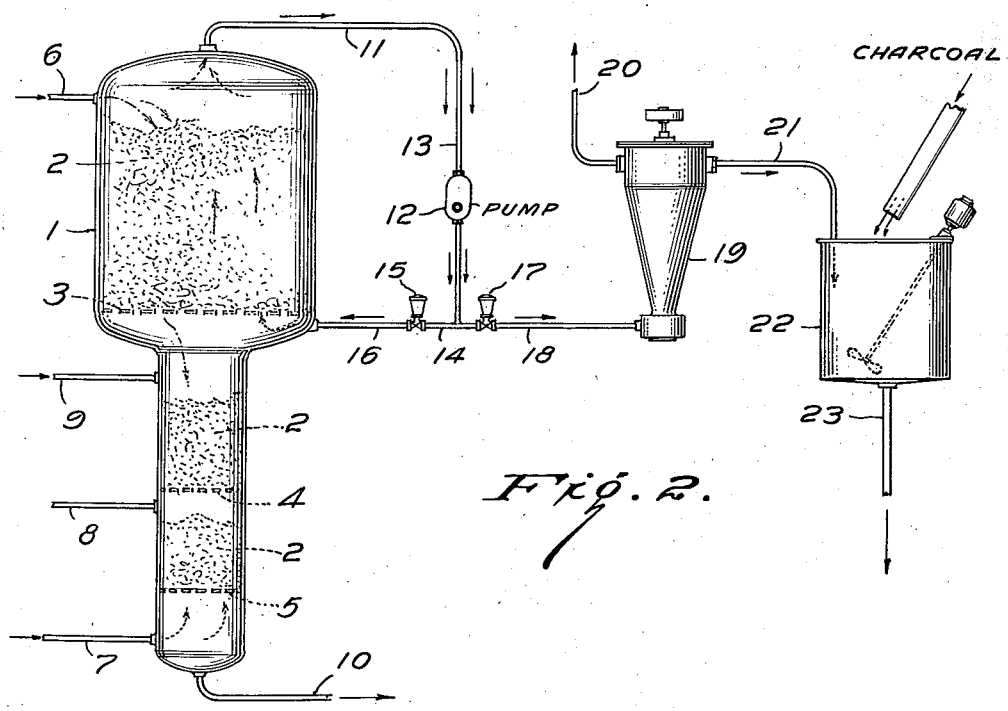

In order to explain the invention in greater particularity, reference is made to Figure 2 of the drawing which is in elevation and shows apparatus suitable for carrying out the process.

In Figure 2 is shown a column 1 which is packed 2 with Raschig rings, saddles, spirals, or other conventional packing shapes. The column and rings may be constructed of stainless steel, wood, glass, ceramic material, or other acid-resistant substance. As shown, the column is in two sections, the upper having a much larger cubic capacity than the lower section. If desired, the column may have the same internal diameter throughout its entire length but in such case the upper section will be longer than the lower section or sections.

Suitably perforated plates 3, 4, 5 are provided to support the packing material in the column.

The column is also provided with a suitable conduit 6 to introduce the penicillin-containing liquor into the top of the column. A conduit 7 is positioned at the base of the column for the introduction of water-immiscible organic solvent. Additional conduits 8 and, if desired, 9 are used for the introduction of acid, as will be described hereinafter. The extracted aqueous phase is withdrawn from the column by conduit 10 and the organic liquid containing penicillin dissolved therein is withdrawn through 11. A pump 12 is provided to recirculate part of the liquor through lines 13, 14, valve 15, and line 16 into an intermediate zone of the packed column. Valve 17 allows withdrawal of all or a predetermined part of the liquor through line 18 to a suitable recovery system.

Although not necessary to the operation of the present process, a centrifuge 19 may be provided for stripping traces of water carried over in the organic liquid from the upper part of the column. The water so removed may be discharged through line 20 to the sewer or may, if its volume warrants, be fed back into the column with the penicillin liquor.

The organic solvent containing the penicillin is removed through line 21 to a mixing tank 22 where it may be treated with a small amount of charcoal and then discharged through line 23 to a filter (not shown) or other recovery apparatus. The solvent may then be treated with a dilute solution of an alkali to convert the penicillin to a crude salt, which may then be recovered or further purified by methods known to those in the art.

In carrying out the process of the present invention, penicillin-containing liquor, usually mash from the fermenting units, either bottles or deep tanks, is filtered to remove mycellium and then, if desired, given a preliminary treatment with a small amount of fuller's earth to remove some of the easily adsorbed impurities. The liquor is then cooled to about 2–8° C. and adjusted to an acidity within the range pH 2.8 to pH 3.5, preferably pH 3.0, with dilute sulfuric acid or other strong mineral acid and then introduced through conduit 6 into the column.

Simultaneously, amyl acetate, or other water-immiscible solvent for penicillin, is introduced through line 7, at the base of the column. Other organic solvents that may be employed include dichlorodiethyl ether, ethylene dichloride, chlorobenzene, nitrobenzene, isopropyl acetate, chloroform, and the like. Preferably, the solvent is cooled before introduction into the column.

As the aqueous penicillin-containing liquor passes down the column it meets a rising flow of organic solvent. The packing in the column creates complete contact between the two liquids and the penicillin is extracted from the aqueous phase by the non-aqueous phase in accordance with the distribution coefficient as determined by the particular solvent used and the pH of the system. As will be seen from Fig. 1, when using amyl acetate and fermentation liquor at a pH of about 3, approximately two parts of the total penicillin will be found in the amyl acetate and one part in the aqueous liquor per equal unit volume. As the aqueous liquor continues down the colunm, in the pH–3 range, most of the penicillin, about 80% under favorable conditions, will be extracted by the organic solvent.

To recover the remaining penicillin from the aqueous phase the pH thereof is reduced to between pH 1.8 and pH 2.2, preferably pH 2.0, by the addition of an acid, for example, 0.5 N sulphuric. As will be seen from Figure 1, the distribution coefficient at these lower pH values is such that more of the penicillin is extracted by the organic solvent.

As noted earlier, these lower pH values result in comparatively rapid destruction of the penicillin. However, by the process just described most of the penicillin has been extracted at a higher pH value with very little destruction. Accordingly, the destructive action of the acid on the penicillin takes place only on a small portion of the total penicillin entering the column. At the same time it is possible to extract most of the penicillin from the liquor with an effective distribution coefficient corresponding to the pH of the aqueous liquor leaving the column, that is, of about pH 2.0.

To secure the advantages of the process described herein it is necessary that certain conditions be maintained. For example, the volume of amyl acetate, or whatever organic solvent that is employed, must be as small as possible so that the extraction of impurities from the aqueous liquor is kept at a minimum. On the other hand, the volume must be such that all of the penicillin is extracted from the aqueous phase. If this latter condition is not obtained, penicillin is carried down the column with the aqueous phase and is eventually destroyed by the acid in the lower portion of the column. When the pH of the aqueous liquor entering the top of the column is 3.0 there should be used approximately one volume of amyl acetate for each two volumes of aqueous liquor. When the aqueous liquor has a higher pH it is necessary to use more organic solvent to extract all of the penicillin. This results in the extraction of more impurities. As the distribution curve depends upon the particular solvent employed and somewhat upon the nature of the fermentation liquor treated, it will be necessary to determine the optimum ratio of liquor to solvent for the particular conditions under which the process operates. Using amyl acetate as the solvent with the mash entering the column at a pH of 2.8 to 3.5, we prefer to use from about 1.0 to 2.0 volumes of aqueous phase for each volume of solvent.

The size and the nature of the packing material is also of importance particularly in controlling the flow of material through the column. If the packing is too small, a heavy emulsion is formed which may fail to break in the column and result in the carrying of part of the aqueous solution out of the column with the solvent. On the other hand, if the packing is too large, there may be insufficient time and water-solvent interface for complete extraction. Exact details of the length of the column, size of the packing, etc. may be readily determined by a chemical engineer with a small amount of experimentation.

A 20 foot column was operated satisfactorily when packed with ⅜" Raschig rings, or their equivalent, with a mash to amyl acetate ration to two to one with the entering mash at pH 3 and the feed to the column at the rate of 60 liters per hour per foot of cross sectional area. The time required for passage of a unit of mash through the column was about 2 hours. Recovery was 95% of theoretical.

As the rate of destruction by acids is greatly accelerated at higher temperature levels it is preferred that the column be operated at as low temperatures as feasible, preferably from 0° C. to 10° C. This is accomplished by passing the solvent and aqueous solution through a cooler prior to introduction into the column, and also, insulating the apparatus.

The point at which additional acid is introduced into the column to increase the hydrogen ion concentration is subject to considerable variation but is so selected that maximum extraction at the higher pH levels is first obtained. Usually the acid is introduced in the lower quarter of the column but the point of introduction may be anywhere from the last half to the last tenth with improvement over simple countercurrent extraction.

As shown in the drawing it may be desirable in some instances to add acid at several points on the column, thus varying the pH of the liquor in several stages from 3.5 to 1.8.

What we claim is:

1. A process of extracting penicillin from aqueous soutions thereof which comprises the steps of adjusting the hydrogen ion concentration of an aqueous solution of penicillin to within the range pH 2.8 to pH 3.5, passing 1.0 to 2.0 volumes of the aqueous liquor through a packed column in countercurrent flow to one volume of water-immiscible solvent for penicillin thereby extracting the major proportion of the penicillin from the aqueous phase, then adjusting the hydrogen ion concentration of the partially extracted aqueous liquor to within the range pH 1.8 to pH 2.2 by the addition of an acid and completing the extraction of the penicillin from the acidified liquor with said water-immiscible solvent.

2. A process of extracting penicillin from aqueous solutions thereof which comprises the steps of adjusting the hydrogen ion concentraton of a cold aqueous solution of penicillin to within the range pH 2.8 to pH 3.5, passing 1.0 to 2.0 volumes of the aqueous liquor through a packed column in countercurrent flow to one volume of amyl acetate thereby extracting the major proportion of the penicillin from the aqueous phase, then adjusting the hydrogen ion concentration of the partially extracted aqueous liquor to within the range pH 1.8 to pH 2.2 by the addition of an acid and completing the extraction of the penicillin from the acidified liquor with said amyl acetate.

3. A process of extracting penicillin from cold aqueous fermentation liquor containing penicillin which comprises the steps of adjusting the hydrogen ion concentration of the said liquor to about pH 3.0, passing two volumes of the said liquor through a packed column in countercurrent flow to one volume of amyl acetate thereby extracting the major proportion of the penicillin from the aqueous phase, then adjusting the hydrogen ion concentration of the partially extracted aqueous liquor to about pH 2.0 by the addition of sulfuric acid and completing the extraction of the penicillin from the acidified liquor with said amyl acetate.

ROBERT DOUGLAS PETTY.
CHARLES ALBERT RICKABAUGH.

REFERENCES CITED

The following references are of record in the file of this patent:

Lancet II, August 16, 1941, pages 177–189.
Abraham British Journal of Exp. Pathology, vol. 23, No. 3, June 1942, pp. 103–116.
Science, vol 96, No. 2479, pp. 21 and 22.